Figure 1:
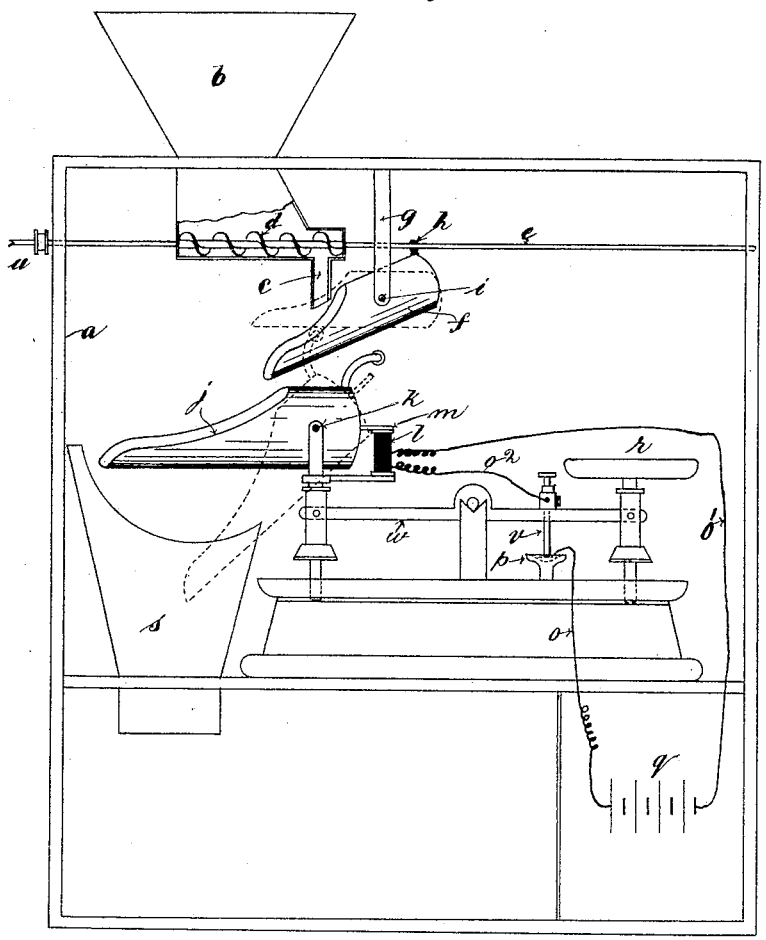

(No Model.)

C. R. GORRINGE.
AUTOMATIC WEIGHING MACHINE.

No. 499,223.  Patented June 13, 1893.

Witnesses
J. Fleming
H. W. Iles

Inventor
Charles Richard Gorringe
per E. Eaton
His Attorney.

UNITED STATES PATENT OFFICE.

CHARLES RICHARD GORRINGE, OF LONDON, ENGLAND.

AUTOMATIC WEIGHING-MACHINE.

SPECIFICATION forming part of Letters Patent No. 499,223, dated June 13, 1893.

Application filed January 3, 1893. Serial No. 457,132. (No model.)

*To all whom it may concern:*

Be it known that I, CHARLES RICHARD GORRINGE, a subject of the Queen of Great Britain, and a resident of Hornsey, London, in the county of Middlesex, England, have invented certain new and useful Improvements in Automatic Weighing-Machines, of which the following is a full, clear, and exact specification.

The object of this invention is to automatically weigh out predetermined quantities of substance supplied in bulk from a hopper.

To carry out my invention I provide a hopper for containing the substance to be weighed. In connection with this hopper is a feeder consisting of a worm with spiral blades arranged upon a shaft and revolving therewith when motion is communicated thereto from driving pulley or pulleys. The revolving of this worm or spiral blades pays out the substance down a chute into a tilting guide and afterward the substance passes out of this guide and deposits itself in a tilting scale pan or the receiving pan of a pair of scales. This tilting scale pan is prevented from tilting by an electro magnet in the circuit of a suitable battery and as soon as the substance in the scale pan has overcome the weight in the other scale pan, the tilting scale pan descends, and in so doing breaks the electric circuit and hence the magnet ceases to attract, the tilting scale pan tilts and deposits the substance in a suitable receptacle such as a bag. The action of the tilting scale shuts off the chute and no further supply of the substance being weighed, can escape down the chute until the scale pan is again ready to receive the charge of substance.

Referring to the annexed drawing, the figure is a sectional side elevation of my invention.

$a$ are outer supports; $b$, hopper; $e$, shaft carrying worm or blades $d$; $c$, chute; $f$, tilting pan pivoted at $i$ to support $g$. and vibrated by cam $h$; $j$, tilting scale pan pivoted at $k$ and carrying armature $m$ and electro magnet $l$; $s$, guide directing the weighed substance into bags; $w$, scale balance lever carrying adjustable contact piece $v$ which makes and breaks contact in the mercury cup or pot $p$.

$q$ is the battery one pole being connected to the electro magnet $l$ by line wire $o'$ the other pole being connected to the mercury pot $p$. by line wire $o$. The contact piece $v$ is connected to the other terminal of the magnet by line wire $o^2$; $r$, scale weight pan; $u$, pulley for driving shaft $e$.

The action is as follows: When the substance to be weighed is fed, into the scale pan $j$ from hopper $b$ and tilting pan $f$, the lever arm $w$ of the scale pan breaks contact at $p$, and consequently the electro magnet $l$ ceases to attract the armature $m$ and thus the scale pan $j$ tilts and deposits the substance down the guide $s$. The scale afterward comes back to its normal position. When the scale pan $j$ tilts; the tilting pan $f$. is raised against the chute $c$ and cuts off the supply of substance from the hopper.

Dotted lines indicate the discharging position of the scale pan $j$ and tilting pan $f$.

What I claim, and desire to secure by Letters Patent, is—

In automatic weighing machines in combination a tilting scale pan carrying an armature, an electro magnet in connection therewith in the circuit of a battery, a contact break and make in connection with the lever arm of scale, whereby the contact is broken upon the descent of the scale pan, a tilting guide operated by the tilting of the scale pan $j$, by which means the supply from the hopper is automatically cut off at a desired moment a hopper provided with a revolving worm which feeds the scale pan substantially as shown.

In testimony that I claim the foregoing I have hereunto set my hand this 27th day of May, 1892.

CHARLES RICHARD GORRINGE.

Witnesses:
   R. CALLON,
   J. L. FLEMING.